(12) United States Patent
Wu et al.

(10) Patent No.: US 7,868,975 B2
(45) Date of Patent: Jan. 11, 2011

(54) COLOR FILTER SUBSTRATE AND FABRICATING METHOD THEREOF AND LIQUID CRYSTAL DISPLAY PANEL

(75) Inventors: Chun-Wei Wu, Chiayi (TW); Cheng-Chung Hu, Taoyuan County (TW); Chiu-Jung Huang, Changhua County (TW); Chao-Song Chang, Taipei (TW); Huan-Ting Li, Changhua County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 365 days.

(21) Appl. No.: 12/187,388

(22) Filed: Aug. 7, 2008

(65) Prior Publication Data

US 2009/0103019 A1    Apr. 23, 2009

(30) Foreign Application Priority Data

Oct. 17, 2007    (TW) ............................... 96138837 A

(51) Int. Cl.
*G02F 1/1335*    (2006.01)
(52) U.S. Cl. .................. 349/106; 349/15; 349/108; 349/160; 349/187
(58) Field of Classification Search .................. 349/15, 349/106, 108, 110, 160, 187; 359/462, 464, 359/465, 891; 345/88; 348/51, 54, 60
See application file for complete search history.

(56) References Cited

U.S. PATENT DOCUMENTS 5,734,457 A * 3/1998 Mitsui et al. ................ 349/106
6,825,985 B2   11/2004 Brown et al.
7,791,271 B2 * 9/2010 Cok et al. .................... 313/506

FOREIGN PATENT DOCUMENTS

TW    I235848    7/2005

* cited by examiner

*Primary Examiner*—Dung T Nguyen
*Assistant Examiner*—Tai Duong
(74) *Attorney, Agent, or Firm*—Jianq Chyun IP Office

(57) ABSTRACT

A color filter substrate having a substrate, a black matrix layer, a first filter layer and a second filter layer is provided. The black matrix layer is disposed on the substrate, and multiple pixel areas is defined on the substrate by the black matrix layer. Each pixel area includes a first sub-pixel area and a second sub-pixel area. The first and second filter layer are disposed in the pixel area, and the second filter layer covers the first filter layer. A refractive index of the second filter layer is greater than that of the first filter layer, such that light emitting direction of the first sub-pixel area is different from that of the second sub-pixel area. Besides, a fabricating method of the color filter substrate and an LCD panel with the color filter substrate are provided. The LCD panel with 3D image display or dual-view function can be easily manufactured.

19 Claims, 7 Drawing Sheets

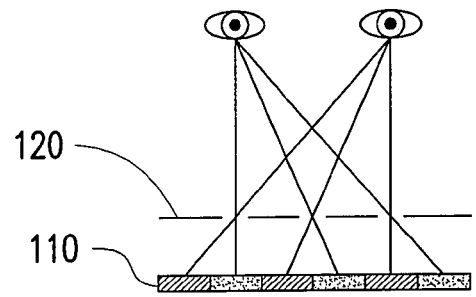
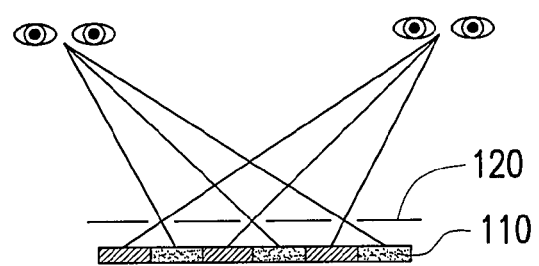
FIG.1A (PRIOR ART)   FIG.1B (PRIOR ART)
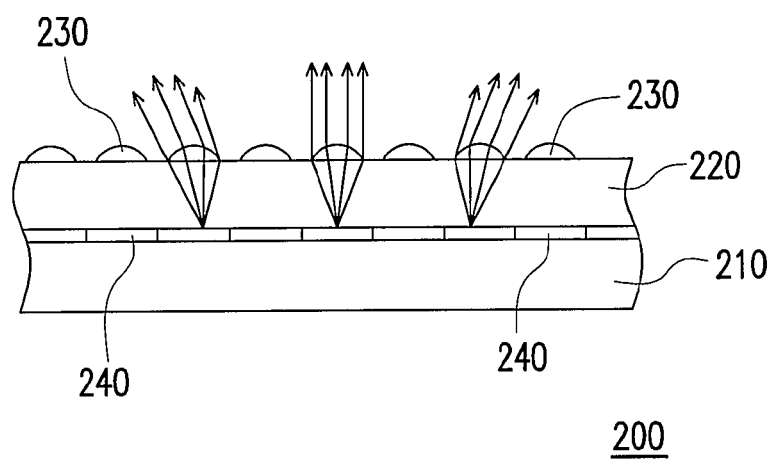
FIG. 2 (PRIOR ART)

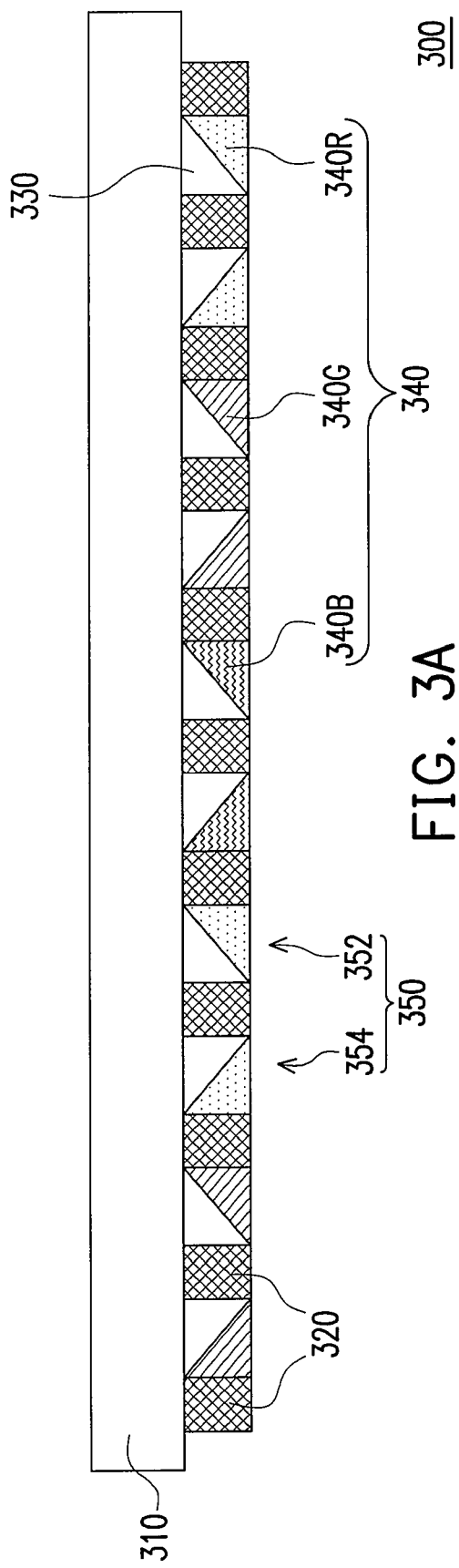
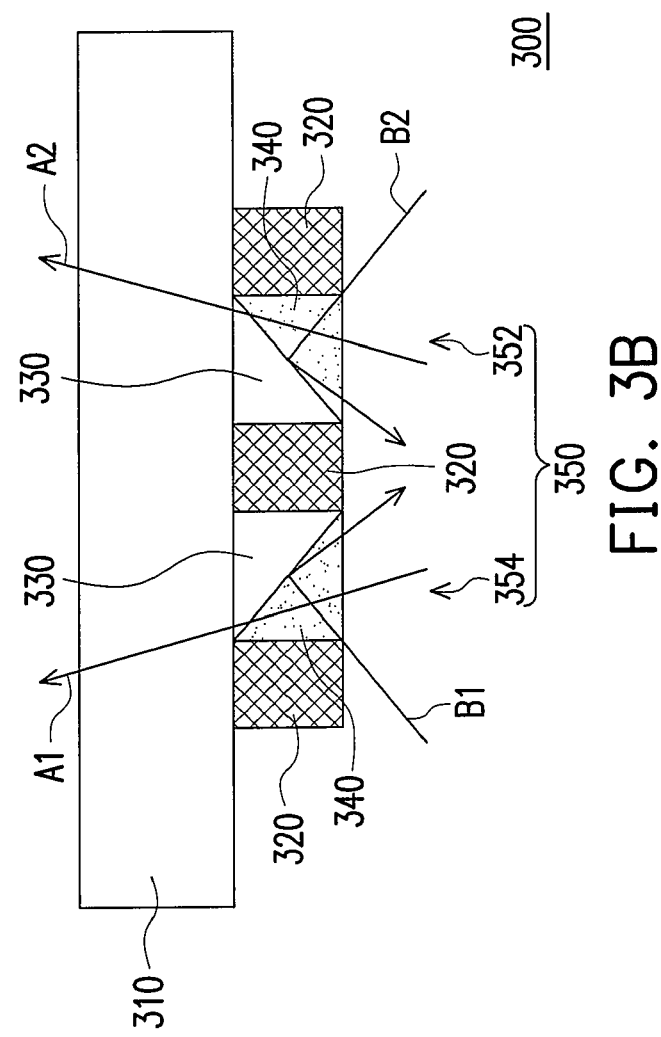
FIG. 3A
FIG. 3B

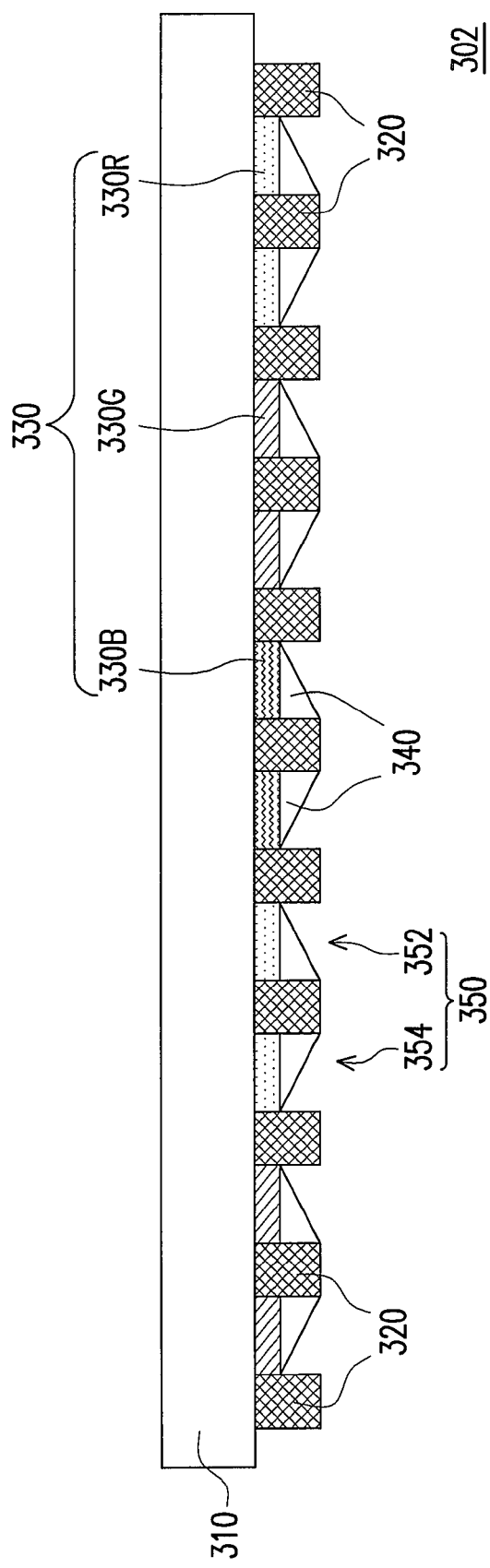
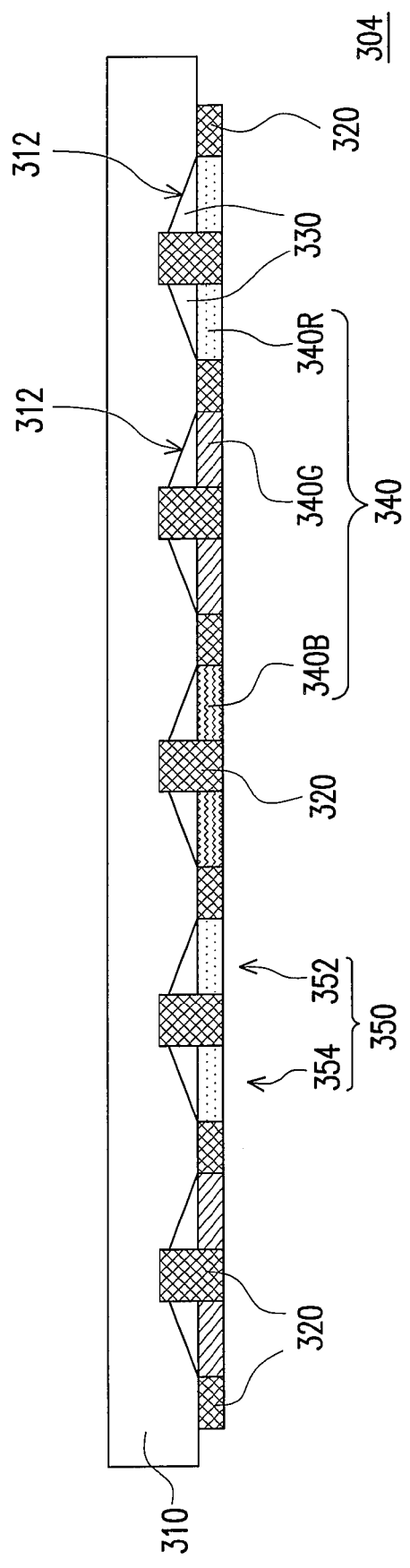
FIG. 4
FIG. 5

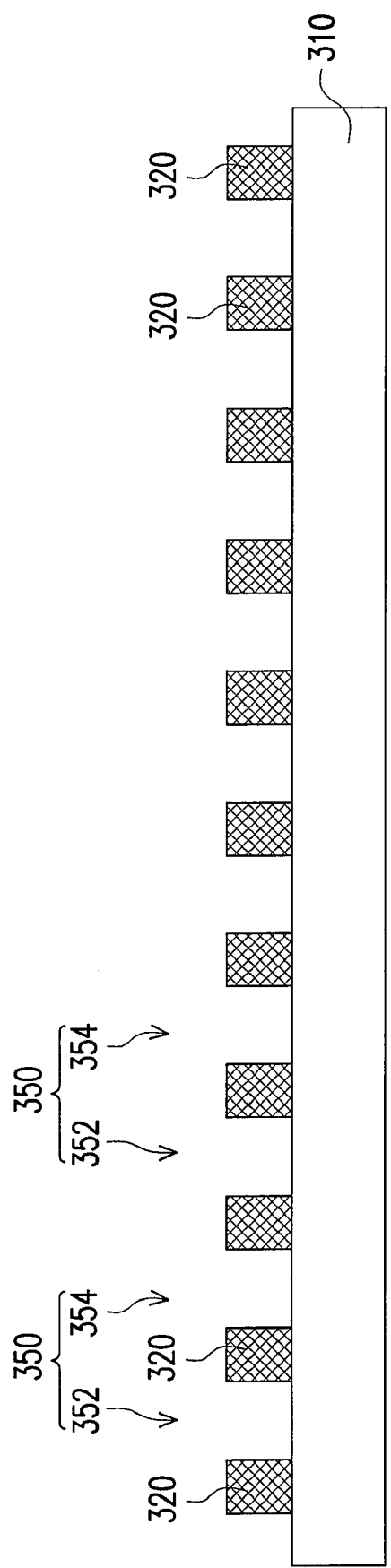
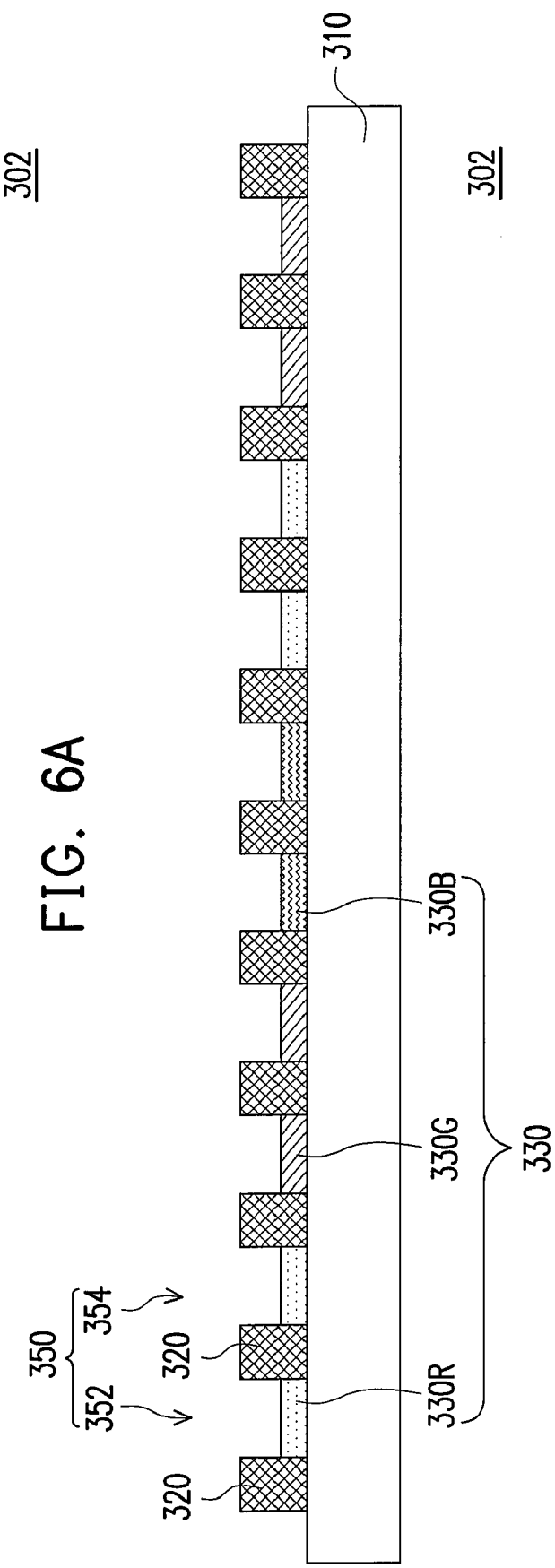
FIG. 6A
FIG. 6B

COLOR FILTER SUBSTRATE AND FABRICATING METHOD THEREOF AND LIQUID CRYSTAL DISPLAY PANEL

CROSS-REFERENCE TO RELATED APPLICATION

This application claims the priority benefit of Taiwan application serial no. 96138837, filed on Oct. 17, 2007. The entirety of the above-mentioned patent application is hereby incorporated by reference herein and made a part of specification.

BACKGROUND OF THE INVENTION

1. Field of the Invention

The present invention relates to a filter substrate, a fabrication method thereof and a display panel. More particularly, the present invention relates to a color filter substrate, a fabrication method thereof and a liquid crystal display (LCD) panel.

2. Description of Related Art

Recently, with development of three-dimensional (3D) image display technique and dual view technique, LCD devices which may display a 3D image and have a dual view purpose have been developed accordingly.

In the 3D image display technique, a left eye and a right eye of an observer may observe different image information respectively; while in the dual view technique, observers situated at a left viewing angle and a right viewing angle observe different image information. Both the two techniques achieve their functions by controlling light emitting angles of specific pixels.

FIG. 1A is a schematic diagram of a conventional 3D-LCD. FIG. 1B is a schematic diagram of a conventional dual view LCD. Referring to FIG. 1A and FIG. 1B, parallax barriers 120 are disposed in front of pixels 110 on the LCDs 100 and 102 for blocking light emitted from certain angles. Such that, the left eye and the right eye of the observer may observe different pixels, and accordingly 3D image purpose is achieved. Moreover, the observers situated at the left side and the right side may observe different video images, so as to achieve a dual view purpose.

FIG. 2 is a schematic diagram of another conventional 3D-LCD. Referring to FIG. 2, an LCD 200 has a first substrate 210 and a second substrate 220. Curved lenses 230 are fabricated on the second substrate 220, and disposed corresponding to each of the pixels 240 for controlling a refraction angle of a light beam passed through the pixels 240. Such that, the left eye and the right eye of the observer may observe different pixels 240. Therefore, different image information may be edited to different pixels 240 for providing to the left eye and the right eye of the observer respectively.

However, as shown in FIG. 1, the parallax barriers 120 on the LCDs 100 and 102 may block most of the light. Therefore, luminance of a display image is decreased.

Moreover, as shown in FIG. 2, the curved lenses 230 of the 3D-LCD 200 are fabricated on the second substrate 220, and the curved lenses 230 must be disposed corresponding to each of the pixels 240. Therefore, a relatively high alignment accuracy is required during fabrication to ensure each of the curved lenses 230 is disposed on a right location for controlling the light emitting angle.

Because fabrication difficulty of the curved lenses 230 is relatively high and the alignment accuracy between each curved lens 230 and each pixel 240 cannot be ensured, fabrication of such 3D-LCD 200 is rather difficult and fabrication cost is relatively high.

SUMMARY OF THE INVENTION

Accordingly, the present invention is directed to a color filter substrate, by which light emitting direction of each sub-pixel area may be adjusted, so as to achieve a 3D image display purpose or a dual view display purpose.

The present invention is directed to a fabrication method of a color filter substrate, by which fabrication process may be simplified, and fabrication cost may be reduced.

The present invention is directed to an LCD panel having the aforementioned color filter substrate, which may easily achieve a 3D image display purpose or a dual view display purpose.

Accordingly, the present invention provides a color filter substrate including a substrate, a black matrix layer, a first filter layer and a second filter layer. The black matrix layer is disposed on the substrate, and a plurality of pixel areas is defined on the substrate by the black matrix layer, wherein each pixel area includes a first sub-pixel area and a second sub-pixel area. The first filter layer and the second filter layer are disposed in the pixel area. The second filter layer covers the first filter layer. A refractive index of the second filter layer is greater than that of the first filter layer, such that light emitting direction of the first sub-pixel area is different from that of the second sub-pixel area.

In an embodiment of the present invention, a profile shape of the aforementioned first filter layer may be a triangle.

In an embodiment of the present invention, a profile shape of the aforementioned second filter layer may be a triangle.

In an embodiment of the present invention, the substrate further includes a plurality of grooves with triangle profile shapes, and the first filter layer, the second filter layer and the black matrix layer are disposed within each of the grooves.

In an embodiment of the present invention, the first filter layer includes a color filter layer or a transparent filter layer.

In an embodiment of the present invention, the second filter layer includes a color filter layer or a transparent filter layer.

The present invention provides a fabrication method of a color filter substrate, and the method is as follows. First, providing a substrate. Next, forming a black matrix layer on the substrate, wherein a plurality of pixel areas is defined on the substrate by the black matrix, and each pixel area includes a first sub-pixel area and a second sub-pixel area. After that, forming a first filter layer within the pixel area, and forming a second filter layer within the pixel area, wherein the second filter layer covers the first filter layer, and a refractive index of the second filter layer is greater than that of the first filter layer, such that the light emitting direction of the first sub-pixel area is different from that of the second sub-pixel area.

In an embodiment of the present invention, the method of forming the first filter layer within the pixel area is as follows. First, forming the first filter layer within the first sub-pixel area. Next, tilting the substrate clockwise, such that a profile shape of the first filter layer within the first sub-pixel area may form a triangle. Then, forming the first filter layer within the second sub-pixel area. After that, tilting the substrate counter-clockwise, such that a profile shape of the first filter layer within the second sub-pixel area may form a triangle.

In an embodiment of the present invention, the method of forming the second filter layer within the pixel area is as follows. First, forming the second filter layer within the first sub-pixel area. Next, tilting the substrate clockwise, such that a profile shape of the second filter layer within the first sub-pixel area may form a triangle. Then, forming the second filter layer within the second sub-pixel area. After that, tilting the substrate counter-clockwise, such that a profile shape of the second filter layer within the second sub-pixel area may form a triangle.

In an embodiment of the present invention, the fabrication method for the color filter substrate further includes forming a plurality of grooves with triangle profile shapes, and forming the first filter layer, the second filter layer and the black matrix layer within each of the grooves.

In an embodiment of the present invention, the first filter layer includes a color filter layer or a transparent filter layer.

In an embodiment of the present invention, the second filter layer includes a color filter layer or a transparent filter layer.

In an embodiment of the present invention, a method of forming the first filter layer and the second filter layer within the pixel area includes inkjet printing.

The present invention provides an LCD panel including a color filter substrate, an active device array substrate and a liquid crystal layer. The color filter substrate includes a substrate, a black matrix layer, a first filter layer and a second filter layer. The black matrix layer is disposed on the substrate, and a plurality of pixel areas is defined on the substrate by the black matrix layer, wherein each pixel area includes a first sub-pixel area and a second sub-pixel area. The first filter layer and the second filter layer are disposed in the pixel area. The second filter layer covers the first filter layer. A refractive index of the second filter layer is greater than that of the first filter layer, such that the light emitting direction of the first sub-pixel area is different from that of the second sub-pixel area. The active device array substrate is disposed oppositely to the color filter substrate. The liquid crystal layer is disposed between the color filter substrate and the active device array substrate.

In an embodiment of the present invention, a profile shape of the aforementioned first filter layer may be a triangle.

In an embodiment of the present invention, a profile shape of the aforementioned second filter layer may be a triangle.

In an embodiment of the present invention, the substrate further includes a plurality of grooves with triangle profile shapes, and the first filter layer, the second filter layer and the black matrix layer are disposed within each of the grooves.

In an embodiment of the present invention, the first filter layer includes a color filter layer or a transparent filter layer.

In an embodiment of the present invention, the second filter layer includes a color filter layer or a transparent filter layer.

In the color filter substrate of the present invention, each of the pixel areas includes the first sub-pixel area and the second sub-pixel area. The first filter layer and the second filter layer with different refractive index are disposed within each pixel area, and one of the filter layers has a specific profile shape. Therefore, the light emitting directions of the first sub-pixel area and the second sub-pixel area may be controlled based on a total reflection principle. Moreover, fabrication process of such color filter substrate is greatly simplified, and fabrication cost thereof is reduced. By applying the color filter substrate to an LCD panel, the LCD panel may easily achieve a 3D image display purpose or a dual view display purpose.

In order to make the aforementioned and other objects, features and advantages of the present invention comprehensible, a preferred embodiment accompanied with figures is described in detail below.

BRIEF DESCRIPTION OF THE DRAWINGS

FIG. 1A is a schematic diagram of a conventional 3D-LCD.

FIG. 1B is a schematic diagram of a conventional dual view LCD.

FIG. 2 is a schematic diagram of another conventional 3D-LCD.

FIG. 3A is a cross-sectional view of a color filter substrate according to the first embodiment of the present invention.

FIG. 3B is an amplified cross-sectional view of a pixel area of FIG. 3A.

FIG. 4 is a cross-sectional view of a color filter substrate according to the second embodiment of the present invention.

FIG. 5 is a cross-sectional view of a color filter substrate according to the third embodiment of the present invention.

FIG. 6A~FIG. 6D are schematic diagrams illustrating a fabrication method of a color filter substrate according to an exemplary embodiment of the present invention.

DESCRIPTION OF EMBODIMENTS

Figure 6C:
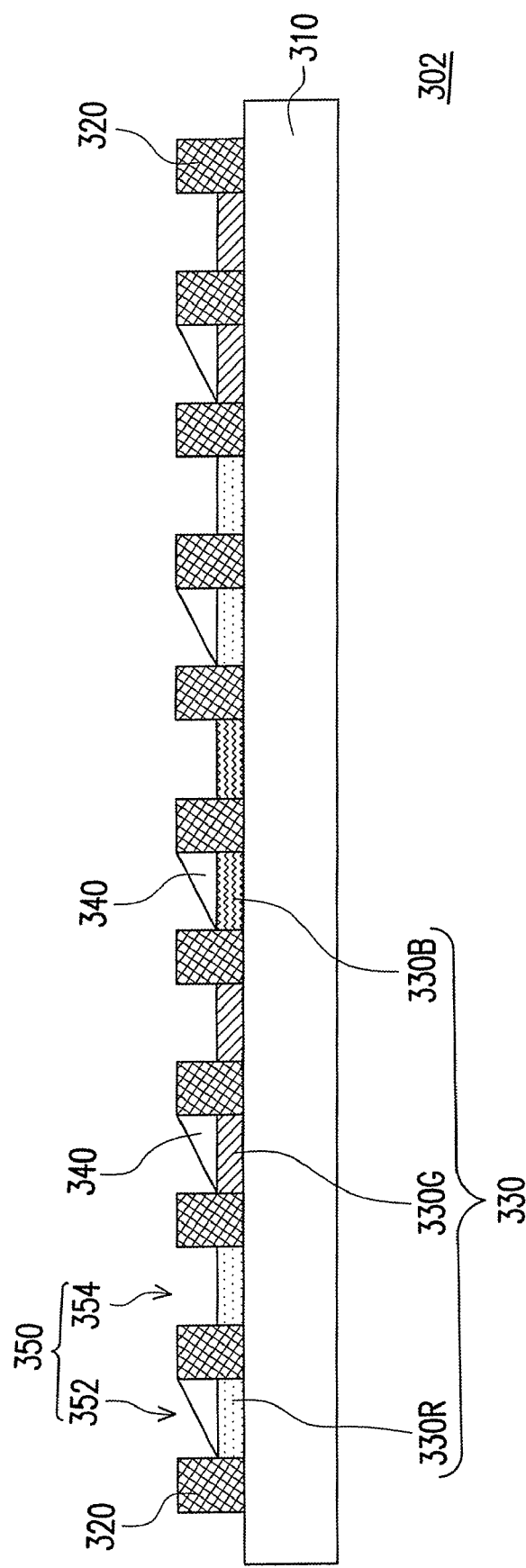

In the following embodiments, a color filter substrate, a fabrication method thereof, and an LCD panel having such color filter substrate are described. Light emitting angels of pixels may be determined by using total reflection principle, such that a left eye and a right eye of an observer may observe different image information to achieve a 3D visual purpose. The following embodiments are only used for examples, and have no intention to limit the present invention.

The Color Filter Substrate

The First Embodiment

FIG. 3A is a cross-sectional view of a color filter substrate according to the first embodiment of the present invention. Referring to FIG. 3A, a color filter substrate 300 includes a substrate 310, a black matrix layer 320, a first filter layer 330 and a second filter layer 340. The black matrix layer 320 is disposed on the substrate 310 and a plurality of pixel areas 350 is defined on the substrate 310 by the black matrix layer 320. Each pixel area 350 includes a first sub-pixel area 352 and a second sub-pixel area 354. The first filter layer 330 and the second filter layer 340 are disposed in the pixel area 350. The second filter layer 340 covers the first filter layer 330. A refractive index of the second filter layer 340 is greater than that of the first filter layer 330, such that light emitting direction of the first sub-pixel area 352 is different from that of the second sub-pixel area 354.

Referring to FIG. 3A again, the first filter layer 330 may be a color filter layer or a transparent filter layer. The second filter layer 340 may also be the color filter layer or the transparent filter layer.

In the present embodiment, the first filter layer 330 may be a transparent filter layer, more particularly, a profile shape of the first filter layer 330 is a triangle. After the first filter layer 330 is formed, the second filter layer 340 is further being fabricated also with a triangle profile, and the second filter layer 340 may be a color filter layer, and may be composed of a red filter layer 340R, a green filter layer 340G and a blue filter layer 340B. Certainly, combination of colors and arrangement sequence of the second filter layer 340 is not limited by the present invention. Namely, the first filter layer 330 may be the color filter layer or the transparent filter layer, and the second filter layer 340 may also be the color filter layer or the transparent filter layer. As long as coordination of the two filter layers will achieve the total reflection purpose.

FIG. 3B is an amplified cross-sectional view of a pixel area of FIG. 3A. As described above, the total reflection of a light beam may be achieved by satisfying the following two conditions: (1) the light beam is transmitted from a medium with a relatively high refractive index into a medium with a relatively low refractive index. (2) an incident angle of the light beam is greater than a critical angle.

Referring to FIG. 3B, a light source (not shown) is actually located under the color filter substrate 300. Therefore, light beams A1 and A2 are transmitted from the medium with the relatively high refractive index (the second filter layer 340) into the medium with the relatively low refractive index (the first filter layer 330). However, the incident angles of the light beams A1 and A2 towards the first filter layer 330 is less than the critical angle, and therefore the light beams A1 and A2 will not be totally reflected. Namely, after the light beams A1 and A2 pass through the second filter layer 340, the light beams A1 and A2 may continually pass through the first filter layer 330 and emit out towards different directions.

Moreover, light beams B1 and B2 are transmitted from the medium with the relatively high refractive index (the second filter layer 340) into the medium with the relatively low refractive index (the first filter layer 330). However, the incident angles of the light beams B1 and B2 towards the first filter layer 330 is greater than the critical angle. Therefore the light beams B1 and B2 will be totally reflected by the first filter layer 330, and a part of the light beams B1 and B2 are even reflected to the black matrix layer 320 and are absorbed by the black matrix layer 320.

To be specific, the light beam B2 transmitted towards left side within the first sub-pixel area 352 may be totally reflected by the first filter layer 330, and a part of the light beam B2 may be absorbed by the black matrix 320. Moreover, the light beam B1 transmitted towards right side within the second sub-pixel area 354 may be totally reflected by the first filter layer 330, and a part of the light beam B1 may be absorbed by the black matrix layer 320. Therefore, the light beam B2 of the first sub-pixel area 352 and the light beam B1 of the second sub-pixel area 354 will not interfere with each other.

As described above, in the color filter substrate 300, the emitting directions of the light beams A1 and A2 respectively from the first sub-pixel are 352 and the second sub-pixel area 354 are different according to the total reflection principle. Therefore, the left eye and the right eye of the observer may observe different image information, such that a 3D visual purpose is achieved. Moreover, by suitably adjusting design parameters, observers situated at the left side and the right side may observe different image information, such that the dual view display purpose may also be achieved.

The Second Embodiment

FIG. 4 is a cross-sectional view of a color filter substrate according to the second embodiment of the present invention. Referring to FIG. 4, the color filter substrate 302 is similar to the color filter substrate 300 of the first embodiment, and the difference between them is as below.

In the present embodiment, the first filter layer 330 may be a color filter layer, namely, the first filter layer 330 may be composed of a red filter layer 330R, a green filter layer 330G and a blue filter layer 330B. Certainly, combination of colors and arrangement sequence of the first filter layer 330 is not limited by the present invention. Moreover, the second filter layer 340 may be the transparent filter layer, particularly, only the profile shape of the second filter layer 340 is a triangle. By such means, the light emitting direction of the first sub-pixel area 352 is different from that of the second sub-pixel area 354 based on the total reflection principle.

Same to the description of FIG. 3B, because the refractive index of the second filter layer 340 is greater than that of the first filter layer 330, light beams may be transmitted from the medium with the relatively high refractive index (the second filter layer 340) into the medium with the relatively low refractive index (the first filter layer 330). Therefore, the light emitting direction of the first sub-pixel area 352 may be different from that of the second sub-pixel area 354 determined by using the total reflection principle. Such that, the left eye and the right eye of the observer may observe different image information, so as to achieve a 3D visual purpose. Similarly, the dual view display purpose may also be achieved by suitably adjusting design parameters.

The Third Embodiment

FIG. 5 is a cross-sectional view of a color filter substrate according to the third embodiment of the present invention. Referring to FIG. 5, the color filter substrate 304 is similar to the color filter substrates 300 and 302 of the above embodiments, and the difference between them is as below.

In the present embodiment, the substrate 310 further includes a plurality of grooves 312 with triangle profile shapes, and the first filter layer 330, the second filter layer 340 and the black matrix layer 320 are disposed within each of the grooves 312.

Similarly, in the present embodiment, the first filter layer 330 may be the transparent filter layer, more particularly, the first filter layer 330 is filled into the grooves 312 with the triangle profile shapes. After the first filter layer 330 is formed, the second filter layer 340 is fabricated. The second filter layer 340 may be a color filter layer, and may be composed of a red filter layer 340R, a green filter layer 340G and a blue filter layer 340B. Certainly, combination of colors and arrangement sequence of the second filter layer 340 is not limited by the present invention. Namely, the first filter layer 330 may be the color filter layer or the transparent filter layer, and the second filter layer 340 may also be the color filter layer or the transparent filter layer. As long as coordination of the two filter layers may achieve the total reflection purpose.

Same to the description of FIG. 3B, since the refractive index of the second filter layer 340 is greater than that of the first filter layer 330, light beams may be transmitted from the medium with the relatively high refractive index (the second filter layer 340) into the medium with the relatively low refractive index (the first filter layer 330). Therefore, the light emitting direction of the first sub-pixel area 352 may be different from that of the second sub-pixel area 354 determined by using the total reflection principle. Such that, the left eye and the right eye of the observer may observe different image information, so as to achieve a 3D visual purpose. Similarly, the dual view display purpose may also be achieved.

In the above three embodiments, the first filter layer 330 and the second filter layer 340 have different refractive indices. The second filter layer 340, located under the first filter layer 330, has a specific profile shape. Therefore, the light emitting direction of the light beams A1 and A2 may be different determined by using the total reflection principle (as shown in FIG. 3B). If the light beams A1 and A2 may carry different image information, the 3D image display purpose and the dual view image display purpose then may be achieved. However, the present invention is not limited to the aforementioned three embodiments.

Similarly, setting of the first filter layer 330 and the second filter layer 340 is not limited by the present invention, as long as the light beam is transmitted from the filter layer with higher refractive index into the filter layer with lower refractive index, and one of the filter layers has the specific profile shape (preferably is the triangle), so as to achieve the total reflection purpose. It is considered to be within the spirit and scope of the present invention.

Next, the fabrication method of the color filter substrates 300, 302 and 304 will be described below.

Fabrication Method of the Color Filter Substrate

The First Embodiment

FIG. 6A~FIG. 6D are schematic diagrams illustrating a fabrication method of a color filter substrate according to an exemplary embodiment of the present invention.

Referring to FIG. 6A, first, a substrate 310 is provided. The substrate 310 may be a glass substrate, a quartz substrate or a substrate made of transparent materials.

Next, referring to FIG. 6A again, a black matrix layer 320 is formed on the substrate 310, and a plurality of pixel areas 350 is defined on the substrate 310 by the black matrix layer 320, wherein each pixel area 350 includes a first sub-pixel area 352 and a second sub-pixel area 354. The black matrix layer 320 may be fabricated based on a transfer printing method or a lithography process etc, which is not limited by the present invention. Moreover, the material of the black matrix layer 320 may be resin material or other materials with a light shading feature.

Referring to FIG. 6B, a first filter layer 330 is formed within the pixel area 350, and a method of forming the first filter layer 330 within the pixel area 350 may be inkjet printing, lithography processing or using a shielding mask with thin film deposition etc. Moreover, the first filter layer 330 may be the color filter layer or the transparent filter layer. In the embodiment of FIG. 6B, the first filter layer 330 is the color filter layer, and may be composed of the red filter layer 330R, the green filter layer 330G and the blue filter layer 330B. Certainly, the combination of colors and arrangement sequence the color filter layer is not limited by the present invention, which may also be a combination of yellow, magenta, cyan and black (YMCK).

Figure 6D:
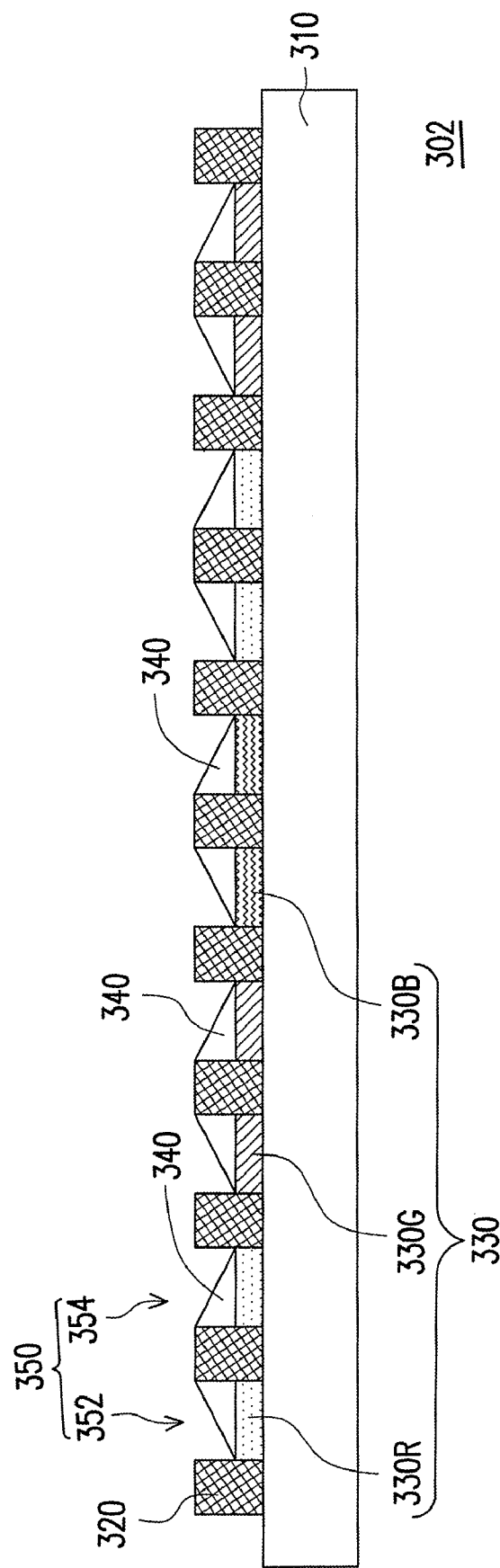

Next, referring to FIG. 6C and FIG. 6D, a second filter layer 340 is formed within the pixel area 350, and the second filter layer covers 340 covers the first filter layer 330, wherein the refractive index of the second filter layer 340 is greater than that of the first filter layer 330, such that the light emitting direction of the first sub-pixel area 352 is different from that of the second sub-pixel area 354. The method of forming the second filter layer 340 may be inkjet printing, lithography processing or using a shielding mask with thin film deposition etc. Moreover, the second filter layer 340 may be the color filter layer or the transparent filter layer. In the embodiment of FIG. 6C, the second filter layer 340 is the transparent filter layer.

More particularly, the method of forming the second filter layer 340 within the pixel area 350 includes the following steps. First, as shown in FIG. 6C, the second filter layer 340 is formed within the first sub-pixel area 352. Next, the substrate 310 is tilted clockwise, such that the profile shape of the second filter layer 340 within the first sub-pixel area 352 may form a triangle. Next, as shown in FIG. 6D, the second filter layer 340 is formed within the second sub-pixel area 354. Finally, the substrate 310 is tilted counter-clockwise, such that the profile shape of the second filter layer 340 within the second sub-pixel area 354 may form a triangle. Then, fabrication of the color filter substrate 302 is completed.

The fabrication method of the color filter substrate shown in FIG. 6A~FIG. 6D is quite simple, and therefore production efficiency may be effectively improved, and fabrication cost may be reduced.

The Second Embodiment

Similar to the steps of FIG. 6A~FIG. 6D, in the fabrication method of the color filter substrate 300 (shown as FIG. 3A), after the black matrix layer 320 is fabricated, the first filter layer 330 with the triangle profile shape may be first formed within the aforementioned pixel area 350, and then the second filter layer 340 is filled in. To be specific, tilting interface is first fabricated based the gravity due to tilting, and then the color layer is filled into the gaps. This method is further simplified.

Referring to FIG. 3A, in the present embodiment, forming of the first filter layer 330 with the triangle profile shape is as follows. First, the first filter layer 330 is formed within the first sub-pixel area 352. Next, the substrate 310 is tilted clockwise, such that the profile shape of the first filter layer 330 within the first sub-pixel area 352 may form a triangle. Next, the first filter layer 330 is formed within the second sub-pixel area 354. Next, the substrate 310 is tilted counter-clockwise, such that the profile shape of the first filter layer 330 within the second sub-pixel area 354 may form a triangle.

Next, the second filter layer 340 is filled into the gaps within the first sub-pixel area 352 and the second sub-pixel area 354, such that the second filter layer 340 may cover the first filter layer 330. Then, fabrication of the color filter substrate 300 is completed.

The Third Embodiment

Moreover, the fabrication method of the color filter substrate 304 of FIG. 5 is as follows. First, the plurality of grooves 312 with the triangle profile shapes is formed on the substrate 310, the grooves 312 may be formed by lathe cutting or lithography processing etc., which is not limited by the present invention. Next, the first filter layer 330, the second filter layer 340 and the black matrix layer 320 are formed within each of the grooves 312.

According to the aforementioned fabrication method of color filter substrates 300, 302, 304, the color filter substrates 300, 302, 304 with the 3D image display purpose or the dual view display purpose may be simply fabricated. The fabrication method is relatively simple, and fabrication cost is relatively low.

The Liquid Crystal Display (LCD) Panel

Figure 7:
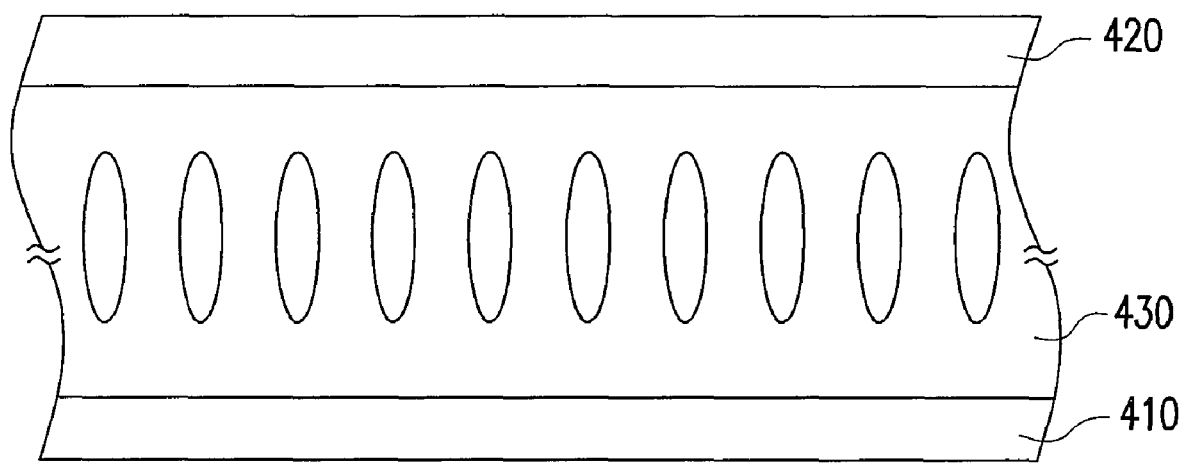
FIG. 7 is a cross-sectional view of an LCD panel according to an exemplary embodiment of the present invention.

FIG. 7 is a cross-sectional view of an LCD panel according to an exemplary embodiment of the present invention. Referring to FIG. 7, an LCD panel 400 includes an active device array substrate 410, a color filter substrate 420 and a liquid crystal layer 430. The color filter substrate 420 may be color filter substrates 300, 302 or 304 respectively illustrated in FIG. 3A, FIG. 4, and FIG. 5. Particularly, the refractive index of the second filter layer 340 is set to be greater than that of the first filter layer 330, such that the light emitting direction of the first sub-pixel area 352 is different from that of the second sub-pixel area 354. The active device array substrate 410 is disposed oppositely to the color filter substrate 420. The liquid crystal layer 430 is disposed between the color filter substrate 420 and the active device array substrate 410.

Similarly, referring to FIG. 3B, according to pixel design of the color filter substrate 300 and the total reflection principle, the light emitting direction of the first sub-pixel area 352 may be different from that of the second sub-pixel area 354. Therefore, if the light beams A1 and A2 respectively carry different image information, the 3D image display purpose and the dual view image display purpose of the LCD panel 400 having the color filter substrate 300 then may be achieved.

Compared to the conventional LCD 100, 102 and 200 of FIG. 1A, FIG. 1B and FIG. 2, because applying of the parallax barriers 120 is unnecessary, the LCD panel 400 of the present invention has a better luminance. Moreover, applying of curved lenses 230 is also unnecessary, such that the high requirement of the alignment accuracy and high fabrication cost may be avoided.

In summary, the color filter substrate, the fabrication method of the color filter substrate and the LCD panel of the present invention have at least the following advantages:

By applying the first filter layer and the second filter layer with different refractive indexes, and one of the filter layer is set to form a specific profile shape, light emitting directions of different sub-pixel areas of each pixel area may be controlled. Besides, fabrication method of the color filter substrate is very simple, such that fabrication process is simplified and fabrication cost is reduced. Moreover, by applying the LCD panel with the color filter substrate of the present invention, the 3D image display purpose or the dual view display purpose may be easily achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color filter substrate, comprising:
   a substrate;
   a black matrix layer, disposed on the substrate, and a plurality of pixel areas being defined on the substrate by the black matrix layer, wherein each pixel area includes a first sub-pixel area and a second sub-pixel area;
   a first filter layer, disposed in the pixel areas; and
   a second filter layer, disposed in the pixel areas, and covering the first filter layer,
   wherein a refractive index of the second filter layer is greater than that of the first filter layer, such that light emitting direction of the first sub-pixel area is different from that of the second sub-pixel area.

2. The color filter substrate as claimed in claim 1, wherein a profile shape of the first filter layer comprise triangle.

3. The color filter substrate as claimed in claim 1, wherein a profile shape of the second filter layer comprise triangle.

4. The color filter substrate as claimed in claim 1, wherein the substrate further comprises a plurality of grooves with triangle profile shapes, and the first filter layer, the second filter layer and the black matrix layer are disposed within each of the grooves.

5. The color filter substrate as claimed in claim 1, wherein the first filter layer comprises a color filter layer or a transparent filter layer.

6. The color filter substrate as claimed in claim 1, wherein the second filter layer comprises a color filter layer or a transparent filter layer.

7. A fabrication method of color filter substrate, comprising:
   providing a substrate;
   forming a black matrix layer on the substrate, wherein a plurality of pixel areas is defined on the substrate by the black matrix layer, and each pixel area includes a first sub-pixel area and a second sub-pixel area;
   forming a first filter layer in the pixel areas; and
   forming a second filter layer in the pixel areas, and the second filter layer covering the first filter layer,
   wherein a refractive index of the second filter layer is greater than that of the first filter layer, such that light emitting direction of the first sub-pixel area is different from that of the second sub-pixel area.

8. The fabrication method of color filter substrate as claimed in claim 7, wherein forming the first filter layer in the pixel areas comprises:
   forming the first filter layer in the first sub-pixel area;
   tilting the substrate clockwise, such that a profile shape of the first filter layer in the first sub-pixel area forms a triangle;
   forming the first filter layer in the second sub-pixel area; and
   tilting the substrate counter-clockwise, such that a profile shape of the first filter layer in the second sub-pixel area forms a triangle.

9. The fabrication method of color filter substrate as claimed in claim 7, wherein forming the second filter layer in the pixel areas comprises:
   forming the second filter layer in the first sub-pixel area;
   tilting the substrate clockwise, such that a profile shape of the second filter layer in the first sub-pixel area forms a triangle;
   forming the second filter layer in the second sub-pixel area; and
   tilting the substrate counter-clockwise, such that a profile shape of the second filter layer in the second sub-pixel area forms a triangle.

10. The fabrication method of color filter substrate as claimed in claim 7, further comprising forming a plurality of grooves with triangle profile shapes on the substrate, and the first filter layer, the second filter layer and the black matrix layer being disposed within each of the grooves.

11. The fabrication method of color filter substrate as claimed in claim 7, wherein the first filter layer comprises a color filter layer or a transparent filter layer.

12. The fabrication method of color filter substrate as claimed in claim 7, wherein the second filter layer comprises a color filter layer or a transparent filter layer.

13. The fabrication method of color filter substrate as claimed in claim 7, wherein a method of forming the first filter layer and the second filter layer in the pixel areas comprises inkjet printing.

14. An LCD panel, comprising:
   a color filter substrate, comprising:
      a substrate;
      a black matrix layer, disposed on the substrate, and a plurality of pixel areas being defined on the substrate by the black matrix layer, wherein each pixel area includes a first sub-pixel area and a second sub-pixel area;
      a first filter layer, disposed in the pixel areas; and
      a second filter layer, disposed in the pixel areas, and covering the first filter layer,
      wherein a refractive index of the second filter layer is greater than that of the first filter layer, such that light emitting direction of the first sub-pixel area is different from that of the second sub-pixel area;
   an active device array substrate, disposed oppositely to the color filter substrate; and
   a liquid crystal layer, disposed between the color filter substrate and the active device array substrate.

15. The LCD panel as claimed in claim 14, wherein a profile shape of the first filter layer comprise triangle.

16. The LCD panel as claimed in claim 14, wherein a profile shape of the second filter layer comprise triangle.

17. The LCD panel as claimed in claim 14, wherein the substrate further comprises a plurality of grooves with triangle profile shapes, and the first filter layer, the second filter layer and the black matrix layer are disposed within each of the grooves.

18. The LCD panel as claimed in claim 14, wherein the first filter layer comprises a color filter layer or a transparent filter layer.

19. The LCD panel as claimed in claim 14, wherein the second filter layer comprises a color filter layer or a transparent filter layer.

\* \* \* \* \*